United States Patent [19]

Gill et al.

[11] Patent Number: 4,528,060

[45] Date of Patent: Jul. 9, 1985

[54] APPARATUS FOR WINDING OF FILAMENTARY COMPOSITES

[75] Inventors: Dee R. Gill, Sandy; Rex B. Marks, Roy, both of Utah

[73] Assignee: Hercules Incorporated, Wilmington, Del.

[21] Appl. No.: 567,446

[22] Filed: Dec. 30, 1983

Related U.S. Application Data

[62] Division of Ser. No. 396,536, Jul. 8, 1982.

[51] Int. Cl.³ .............................................. B65H 81/00
[52] U.S. Cl. .................................. 156/432; 156/380.1; 156/380.9
[58] Field of Search ............... 156/428, 429, 430, 431, 156/432, 272.2, 274.4, 379.6, 380.1, 380.9, 275.5, 275.7, 173, 175

[56] References Cited

U.S. PATENT DOCUMENTS

| | | | |
|---|---|---|---|
| 2,032,461 | 5/1962 | Baker et al. | 156/175 |
| 2,714,414 | 8/1955 | De Ganahl et al. | 154/1.8 |
| 2,723,705 | 11/1955 | Collins | 154/1.7 |
| 2,760,549 | 8/1956 | Nash et al. | 154/1.8 |
| 3,068,133 | 12/1962 | Cilken et al. | 156/428 |
| 3,068,134 | 12/1962 | Cilker et al. | 156/172 |
| 3,249,481 | 5/1966 | Boggs | 156/172 |
| 3,256,128 | 6/1966 | Richardson et al. | 156/353 |
| 3,396,522 | 8/1958 | Biagini | 57/15 |
| 3,407,101 | 10/1968 | Lockshaw | 156/175 |
| 3,448,569 | 6/1969 | Brown et al. | 57/15 |
| 3,532,579 | 10/1970 | Havens et al. | 156/431 |
| 3,769,127 | 10/1973 | Goldsworthy et al. | 156/172 |
| 4,125,423 | 11/1978 | Goldsworthy | 156/428 |
| 4,142,352 | 3/1979 | Greczin | 57/15 |
| 4,171,626 | 10/1979 | Yates et al. | 64/1 S |
| 4,236,386 | 12/1980 | Yates et al. | 64/1 S |
| 4,238,539 | 12/1980 | Yates et al. | 428/36 |
| 4,238,540 | 12/1980 | Yates et al. | 428/36 |
| 4,248,062 | 2/1981 | McLain et al. | 64/1 S |
| 4,251,036 | 2/1981 | McLain | 242/7.21 |
| 4,309,865 | 1/1982 | Brunsch et al. | 57/15 |

Primary Examiner—Michael Ball
Attorney, Agent, or Firm—Edmund C. Ross, Jr.

[57] ABSTRACT

This invention relates to industrial manufacture of composite tubes in a continuous fashion. The invention utilizes a segmented mandrel which proceeds as a train of endwise joined segments through a composite tube forming machine. Segments are added to and subtracted from the mandrel during manufacture of the tubes.

16 Claims, 13 Drawing Figures

APPARATUS FOR WINDING OF FILAMENTARY COMPOSITES

This application is a division of application Ser. No. 396,536, filed July 8, 1982.

BACKGROUND OF THE INVENTION

1. Field of Use

This invention relates to manufacture of hollow, filamentary composite tubes. The resulting tubes have the filamentary reinforcement selectively positioned within a thermoset resin matrix; they can be used, for example, to transmit torque in the drive train of motor vehicles.

2. Prior Art

Filamentary composite tubes have been proposed for reduced weight shafts in the drive train of motor vehicles. See, for example, U.S. Pat. Nos. 4,171,626; 4,236,386; 4,238,539; 4,238,540 and 4,289,557. See, also, "Development of an Advanced Composite Tail Rotor Driveshaft" by Zinberg et al presented at the 26th Annual National Forum of the American Helicopter Society, Washington, D.C., June 1970.

Fabrication of composite tubes by applying fiber to a cylindrical mandrel is known. See, for example, U.S. Pat. Nos. 4,248,062; 4,532,579 and 3,407,101. This invention differs from these prior art techniques in that it provides for successive production of suitably reinforced composite tubes using a continuous tubular mandrel of joined mandrel segments.

OBJECTS OF THE INVENTION

It is an object of this invention to provide composite tubes reinforced by continuous filaments in a thermoset resin matrix.

It is an object of this invention to provide for manufacture of these tubes in a continuous fashion.

It is an object of this invention to provide for selectively positioning these filaments during such manufacture.

It is an object of this invention to provide such a manufacturing process wherein the resulting composite tubes have use in such torque-transmitting applications as car or truck drive shaft members.

It is an object of this invention to provide a system for making composite tubes in an industrially advantageous manner.

These and other objects of this invention have been achieved; this will be appreciated from the following which describes the manner in which they are presently accomplished.

In the following description of this invention: "Process mandrel" means a continuous tubular mandrel formed of discrete mandrel segments joined to each other along their central longitudinal axes and around which a tubular composite can be formed. "Mandrel segment" means a tubular segment that can be connected to and disconnected from the process mandrel. "Composite tubular member for a light truck" means a fiber and resin tubular body having continous filaments in thermoset resin, the structural properties of which tubular body are exemplified by critical frequency not to exceed 98.23 Hz, shear torque 56,000 in-lb, buckling torque 56,000 in-lb. "Process mandrel portion" means a longitudinal portion of the process mandrel which includes any number or portion of its joined segments. "Layer" means a pair of filamentary plies, a first of which is disposed at a plus or minus first angle relative to a line parallel to an axis and the second of which is disposed at a second angle of about the same magnitude as the first angle but the negative thereof relative to such line. "Ply" means a group of filaments disposed at the substantially same angle in a geometric plane concentric with a mandrel portion which plane is normally cylindrical or substantially cylindrical in this invention.

BRIEF SUMMARY OF THE INVENTION

Composite tubes of this invention can carry sufficient filamentary reinforcement in their walls to transmit torque effectively in the drive train of motor vehicles. An application of these tubes is use (with integrated metallic end fittings) as drive shaft members for light trucks.

This invention provides a composite tube by first depositing, curing and cutting a fiber and resin tubular mass about a mandrel segment that is in relative motion with a device that performs such operations, and then separating the cured and cut tubular mass and mandrel segment from each other to yield the composite tube. The composite tube may have end fittings comprising metal sleeves incorporated during this procedure by placing the sleeves around the ends of the mandrel segment prior to starting the composite tube fabricating sequence.

This invention automates the foregoing by causing a number of endwise joined mandrel segments to proceed as a train longitudinally through the series of tube fabricating operations.

DETAILED DESCRIPTION OF PREFERRED EMBODIMENT OF THE INVENTION

Figure 1:
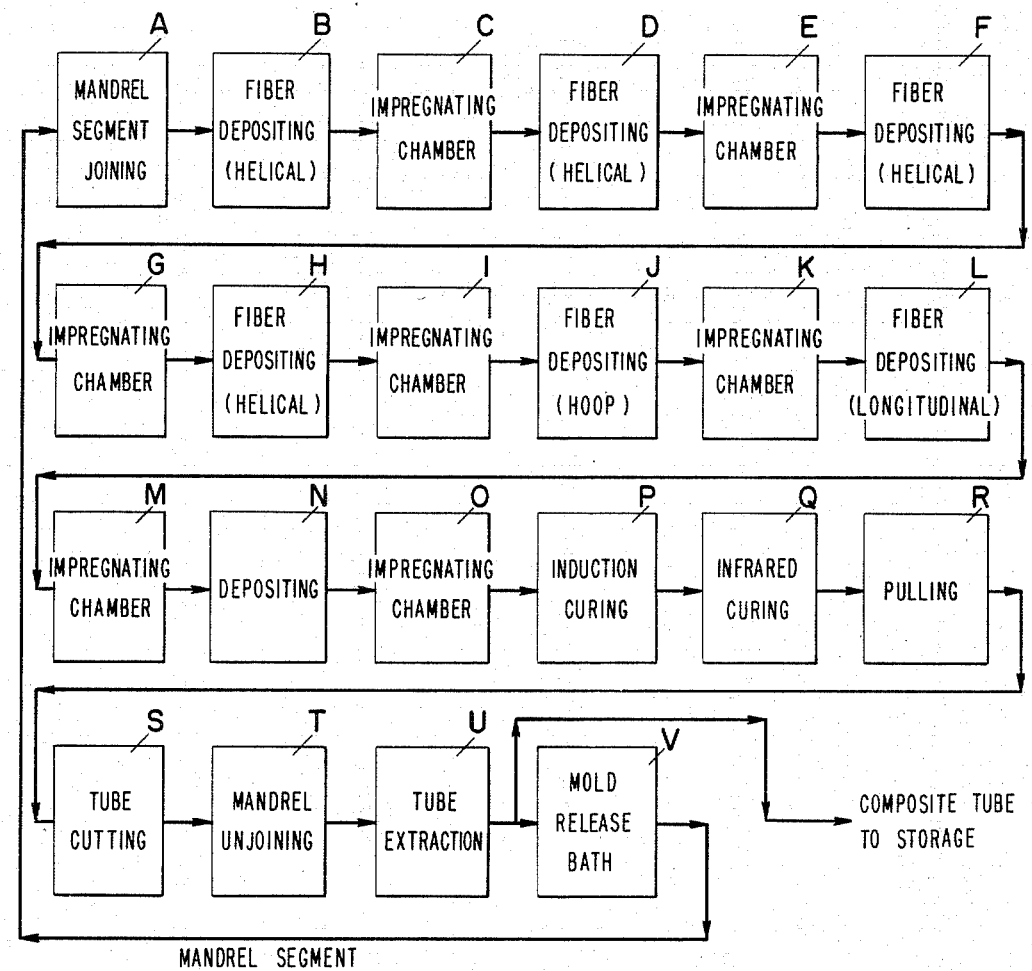
FIG. 1 outlines diagramatically a process sequence that utilizes this invention in producing composite tubes thereof.

FIG. 1 shows the fabrication steps which result in composite drive shaft tubes for light trucks in accordance with this invention. The fabrication sequence is illustrated in FIG. 1 as a series of steps set forth in the order in which the tubes are made.

In general, endwise joined segments of a process mandrel sequentially proceed lengthwise through the tube fabricating stations identified in the fabrication sequence of FIG. 1. In the final tube forming operation, however, individual mandrel segment of the process mandrel are disconnected and a completed composite tube is extracted from each disconnected segment, the latter occurring off line from steps that precede it. Also, in the beginning of this process sequence a fresh mandrel segment is periodically joined to the rear mandrel segment of the process mandrel. The fresh mandrel segment being joined to the process mandrel may have a cylindrical metal sleeve around either or both of its ends whereby the metal sleeve becomes integrated into the composite tube produced by the sequence of FIG. 1.

At the beginning of the tube fabricating process sequence depicted in FIG. 1, a mandrel segment, as mentioned, is joined to the rear of a previously assembled process mandrel at joining station A. The process mandrel comprises a number of connected segments which together have a common central longitudinal axis. (See FIG. 2 for a cross-section of two joined mandrel segments). Hand over hand clamps at station R continually pull the process mandrel away from joining station A and through the other tube fabricating stations that are downstream thereof.

A moving grip jaw at station A prevents rotation of the moving process mandrel. The grip jaw holds the process mandrel while the unconnected, fresh mandrel segment is spun into locking engagement with, and becomes the rear segment of, the process mandrel proceeding as a train of segments through downstream tube fabricating operations. An upstream ball rail mounted wrench rotates in spinning this unconnected mandrel segment into the locking relation at station A. The rotating wrench translates in a downstream direction longitudinally along the upstream extension of the process mandrel central longitudinal axis in joining the new mandrel segment to the process mandrel. A bed of rollers carry the end of the process mandrel and the mandrel segment being joined thereto during the joining operation. The rollers are rotatable in the direction that the process mandrel proceeds.

At station B dry fiber is deposited around the portion of the process mandrel that proceeds therethrough. Station B comprises a helical applicator. The helical applicator deposits a ply or plies of continuous filaments either at an angle between about $+35°$ and $+55°$ or between about $-35°$ and $-55°$ relative to a line parallel to the central longitudinal axis of the process mandrel.

There are four helical applicators in the fabrication sequence of FIG. 1, labeled B, D, F and H, each of which applicators deposits a ply or pair of plies at an angle within the above ranges.

Helical applicators of station B, D, F and H each comprise a wheel having a plurality of fiber carrying spools spaced about its periphery. The wheels of adjacent stations rotate at similar rates (but opposite each other) in spinning the continuous filaments about the process mandrel from these spools (see FIG. 3 for a view of the two counter rotating wheels). As a result of passage of the process mandrel through fiber deposition at these wheels, segments of the process mandrel are covered with a layer or layers of continuous filaments, as desired. For example, two layers of continuous filament can be deposited by stations B, D, F and H. In making light truck drive shaft tubes, each pair of the stations deposits a layer of filament. The layer has a $+45°$ ply and a $-45°$ ply where these angles are each relative to a line parallel to the central longitudinal of the process mandrel.

In making these truck drive shaft tubes, each of stations B, D, F and H deposits between about 0.024 and 0.334 lbs of fiber per linear foot of the process mandrel. Each of these station B, D, F and H can utilize up to 80 rovings with yields of 113 and 1800 yrds. per lb. where the rovings each comprise E-glass filaments.

Stations C, E, G, I, K, M and O in the sequence of FIG. 1 provide for impregnation of the fiber deposited on the process mandrel. Station C like the other of these stations (except station O) includes a resin impregnation chamber. (A cross-section of a typical resin impregnation chamber appears in FIG. 6.)

Station O utilizes a tubular conduit communicating with, and suspended from, a resin supply tank for direct application of resin. The resin passes through the conduit and onto the passing fiber and resin tube proceeding from station N. The resin is worked into the passing fiber at station O by a downstream roller such as a paint roller that continuously circles the segmented mandrel. A rotating elastomer wiper blade downstream of this roller wipes resin from the fiber.

Impregnation alternatively, however, can occur by means of impregnation chamber or such direct application at any or all of stations C, E, G, I, K, M and O. For example, station M could be omitted.

The process mandrel proceeds through the impregnation chamber of stations C, E, G, I, K, M and O (and the other stations) at any desired rate preferably between 1.5 and 6 feet per minute in the sequence being described. At these rates, the fiber absorbs about an equal volume of thermosettable resin. Fiber wetting reaches an equilibrium at about 50 percent of the total composite volume. Additional impregnation stations do not significantly affect the fiber to resin ratio.

Station J in the sequence of FIG. 1 deposits dry fiber around the process mandrel over the impregnated fibers thereof as it proceeds from the impregnation at station I. Station J comprises a rotating hoop applicator wheel that rotates to wind a band of continuous fiber as it spins around the moving process mandrel. (See FIG. 5 for a view of this wheel). The hoop applicator applies a ply of continuous filaments to the moving process mandrel at an angle between about either $+80°$ or $-80°$ and $90°$ relative to a line parallel to the central longitudinal axis of the process mandrel.

For a truck drive shaft tube made using a process mandrel having a four inch diameter and proceeding at a rate described, the hoop applicator spins around the process mandrel at between about 18 and 72 rpm in depositing a 1 inch wide band of E-glass filaments that contains of between 113 and 1800 yrds. per lb.

Station L deposits continuous graphite filaments about the fiber wound and resin impregnated process mandrel proceeding from stations J and K respectively. Station L deposits continuous filaments about the process mandrel at an angle of about 0° relative to a line parallel to the longitudinal axis of the process mandrel. Station L preferably utilizes two or more longitudinally spaced distribution rings. Rovings pass through these rings and then lay upon the previously fiber covered and resin impregnated process mandrel as it travels through the rings. (See FIG. 4 for a view of the longitudinally spaced applicators of station L).

The rings each comprise an orifice which encircles the process mandrel; the rings each have holes spaced around their peripheries. The holes guide the rovings as they lay upon the fiber covered and resin impregnated process mandrel proceeding through the rings from station K or from an upstream ring of station L. Holes of the adjacent distribution rings are offset from each other so that the yarns or rovings are layed all around the fiber covered and resin impregnated, process mandrel.

The yarns or rovings at station L have between about 12,000 and 36,000 filaments per roving in making the truck drive shaft composite tubes. The yarn or roving in making these drive shaft tubes comprise graphite filaments that are A-graphite. Together these filaments weigh between about 0.147 and 0.328 lbs per linear foot of the process mandrel after exit from station L. The rovings issue from the distribution rings at up to about six feet per minute in making such tubes.

Station N (of the sequence of FIG. 1) wraps the longitudinally disposed filaments carried on the process mandrel from station L with a hoop ply of dry filaments. The hoop ply is deposited by rotating hoop wheel applicator such as discussed in reference to station J. Stations J and N each deposit the hoop ply of dry fiber at plus and minus angles of either between about +80° and 90° or between about −80° and 90° relative to a line parallel to the center longitudinal axis of the process mandrel in making the truck drive shaft composite tubes.

Station O applies liquid thermosetting resin to the fiber and resin covered process mandrel proceeding from station N, as described above.

The fiber and resin covered process mandrel, impregnated at station O then proceeds therefrom to station P which initiates cure of the thermosettable resin, station P being shown in the sequence of FIG. 1.

A plurality of induction coils initiate this cure at station P. (The device carrying these induction coils is depicted schematically in FIG. 7). The induction coils provide a sufficient temperature increase in the resin to result ultimately in a cure thereof. Generally, in making the truck drive shaft tubes, the temperature of a mandrel segment leaving station P desirably will be between about 250° F. and 325° F., when using vinyl ester thermosettable resin such as Derakane from Dow Chemical Corp.

Station Q of the sequence depicted in FIG. 1 comprises infrared heaters. The heaters increase the outside skin temperature to 200° F. A bank of five infrared heaters are mounted around a 6 foot long cylinder. Station Q eliminates surface tack which may exist when curing thermosettable resin containing a styrene monomer in air.

Some distance exists between station Q and station R. Station R of the sequence depicted in FIG. 1 grips the hardened resin tube proceeding from station Q. Station R grips the composite tube sufficiently to pull it through the proceeding stations. Station R has two hand over hand gripping clamps. The hand over hand gripping mechanism may be purchased from Goldsworthy Engr. of Torrence, Cal.

Station S of the process sequence depicted in FIG. 1 severs the hardened tube proceeding from station R. Station S comprises a pair of rotating saw blades. The saw blades cut the curing or cured tube around either side of the juncture between two joined mandrel segments of the process mandrel. The blades rotate about the process mandrel to sever a composite tube completely from the upstream portion thereof. (See FIG. 8 for a view of the cutter. The short cylindrical section of composite tube formed between the blades by the cutting action thereof is removed at station U during the pulling of the mandrel segments from their respective composite tubes.) The blades translate along a line parallel to the central longitudinal axis of the process mandrel in severing the cured tube as it proceeds through station S. After the tube is severed, the blades together translate upstream to their starting position.

Station T of the process sequence identified in FIG. 1 disconnects the mandrel segment carrying a severed tube from the rest of the process mandrel. A clamping jaw at station T prevents rotation of the process mandrel by gripping an upstream portion thereof around the cured composite tube that it carries. The downstream joined mandrel segment is then disconnected from the rest of the process mandrel by a rotating hex wrench at station T. The rotating hex wrench engages the leading mandrel segment (carrying the composite tube severed at station S) and spins it free of the moving upstream train of joined mandrel segments. (See FIG. 9 for schematic view of the mandrel segment disconnecting and tube extracting device combination.)

The disconnected mandrel segment carrying the cured composite tube proceeds to station U of the process sequence depicted in FIG. 1. Station U is at the side of the main machine axis. The composite tube is extracted from the disconnected mandrel segment in an extraction die. The disconnected mandrel segment is pulled through the extraction die stripping the cured composite tube. The disconnected mandrel segment proceeding from the extraction die, now free of the cured composite tube, then proceeds to station V which contains a mold release bath. The freed mandrel segment is still at elevated temperature (e.g. 130° F.) as it enters this mold release bath. The elevated temperature helps bake the mold release of the extracted mandrel segment.

The cured composite tubular member, when freed of the disconnected mandrel segment, can be rolled to a storage cart. The mandrel segment, when freed of the cured composite tubular member can be returned to station A for further use.

The composite tubular member when used in a truck drive shaft can incorporate a metal sleeve at each end. The metal sleeve can be adhesively bonded within, or on the outside of, the tube. Alternately, each mandrel segment can carry metal sleeves at its ends through the fabrication sequence of FIG. 1. These sleeves act as parts of the mandrel segment in that the composite tube is formed about them. A riveting operation can rivet the sleeves in this latter case to the composite tubular member after completion of tube manufacture (i.e. after station V).

The method of this invention has been described in a tube fabrication sequence suited for making truck drive shaft composite tubes. As, however, may be apparent, such sequence is but illustrative of the many sequences that can be used in making these or other composite tubular members using principles of this invention. Another sequence is A, B, C, D, E, J, K, L, M, N, P, Q, R, S, T, U and V; different combinations of fiber yield and numbers of rovings can also be employed in any of these sequences.

FIGS. 2 through 9 illustrate equipment identified in previous description of the process sequence of FIG. 1.

Figure 2:
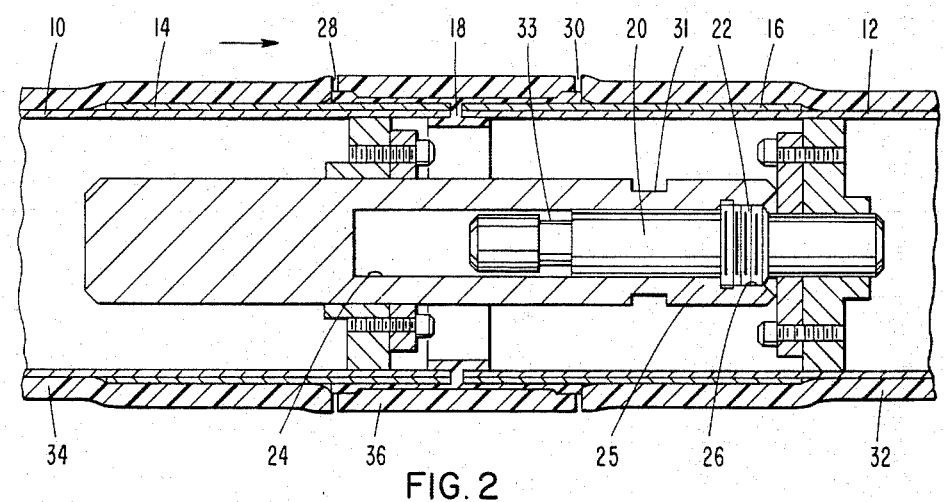
FIG. 2 schematically depicts a cross section of end portions of two joined mandrel segments used in practicing this invention. The end portions are depicted with the composite tubes they carry after the cutting operation in the sequence of FIG. 1.

FIG. 2 is a cross-section of the joined ends of two cylindrical mandrel segments 10, 12 that are used in making composite drive shaft tubes for certain light trucks in connection with the process sequence of FIG. 1. Joined mandrel segments 10, 12 have cylindrical steel sleeves 14, 16 which slip over their respective ends. Plastic sleeve 18 fits cylindrically about and between adjoining end portions of steel sleeves 14, 16 and between segments 10, 12.

The opposite ends (not shown) of each mandrel segments 10, 12 are configured to permit their respective joining with other mandrel segments.

Mandrel segment male member 20 is bolted to mandrel segment 12 and has integral male acme threads 22 for connecting mandrel segment 12 to mandrel segment 10. Mandrel segment 10 has socket 24 with threads 26 for receipt of threads 22 in locking relation. Mandrel segment 10 joins to mandrel segment 12 with relative rotation between them of between about 1 and 2 revolutions. The unthreaded portion of male member 20 guides the approach and retreat of mandrel segment 12 to and from mandrel segment 12.

Mandrel segments 10, 12 depicted in FIG. 2 have proceeded through tube cutting station S in the sequence of FIG. 1. Circumferential spaces 28, 30 depict where station S has severed the composite tube carried by the mandrel segments 10, 12. Mandrel segment 12 leads mandrel segment 10 in this sequence in the direction shown in FIG. 2. Accordingly, mandrel segments 10, 12 carry downstream cured composite tube 32, upstream composite tube 34 and intermediate composite tube 36. Downstream composite tube 32 becomes, with sleeve 16 and a sleeve (not shown) at the other end of mandrel segment 12, a drive shaft member of this invention after it is separated from mandrel segment 12. Upstream composite tube 34 becomes another drive shaft member with sleeve 14 (and other sleeve) once tube 34 is severed and the severed tube separated from mandrel segment 10. Intermediate composite tube 36 remains with mandrel segment 10 after disconnection of mandrel segment 12 therefrom until stripping of tube 34 from mandrel segment 10 at station U.

Intermediate composite tube 36 has been cut out at tube cutting station S. Plastic sleeve 18 serves to provide tolerance in the depth of this cut.

Figure 3:
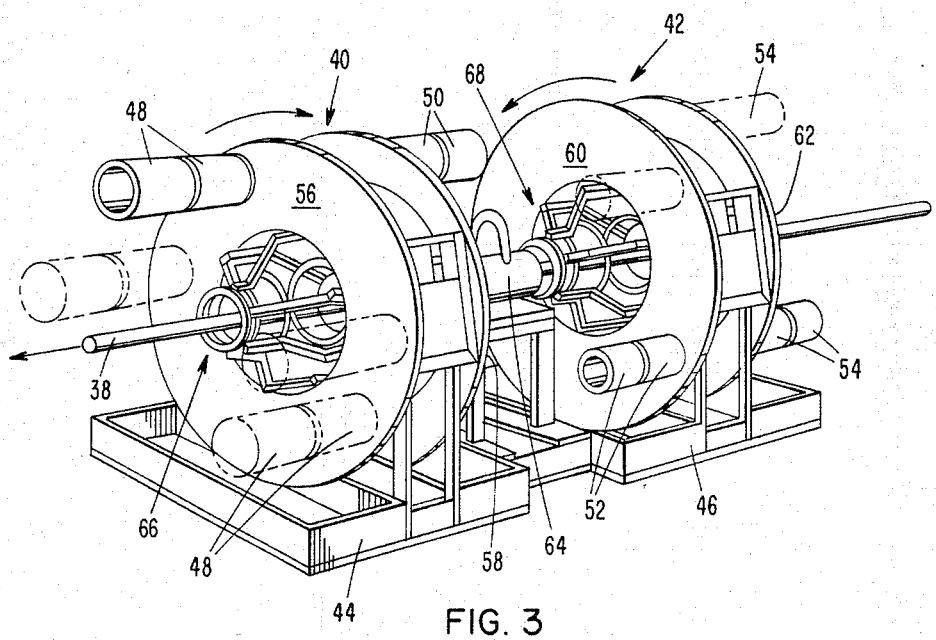
FIG. 3 schematically depicts in perspective an applicator for applying helically disposed fibers to a process mandrel portion passing through the applicator.

FIG. 3 depicts an apparatus which is depositing fiber about process mandrel portion 38 as it passes through wheels 40, 42 carried by respective fixed mounts 44 and 46. Each of wheels 40, 42 has a plurality of spools (a few pairs of which are depicted as respectively, 48, 50 and 52, 54) of continuous filament fixed around their respective faces 56, 58 and 60, 62. The wheels counter rotate, such as in the directions shown in FIG. 3, in depositing continuous filaments about process mandrel portion 38 as discussed above in connection with stations B and D and F and H of FIG. 1. Resin impregnation chamber 64 is between wheels 40, 42.

Continuous filaments from spools 48, 50 and 52, 54 pass to respective annular deposition ring assemblies 66, 68 which rotate with their respective wheels 40, 42. This fiber passes through holes in the annular ring assemblies 66, 68 for orientation onto process mandrel portion 38. The speed at which wheels 40, 42 and consequently rings assemblies 66, 68 rotate relative to the axial translation of process mandrel portion 38 through these ring assemblies determines the angle at which the fibers deposit on process mandrel portion 38.

Figure 3A:
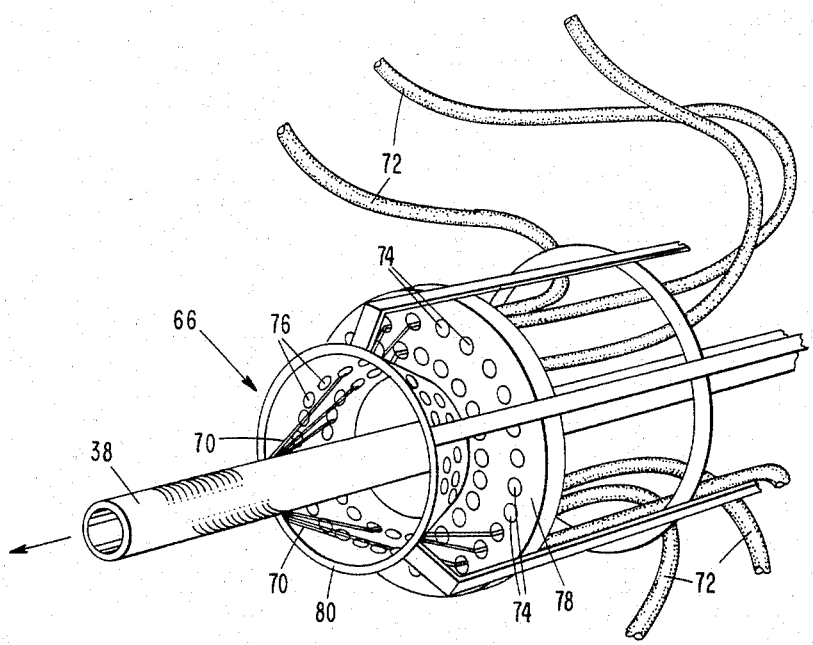
FIG. 3A is a detail of the annular deposition ring assembly of a wheel depicted in FIG. 3.

FIG. 3A is a detail of ring assembly 66 of FIG. 3. Continuous filament 70 feeds from plastic tubes such as 72 and through holes such as 74, 76 respectively in orienting plates 78, 80. Tubes 72 serve to protect filaments 70 and enable ready threading thereof from the spools (e.g. 48, 50) of filaments.

Figure 4:
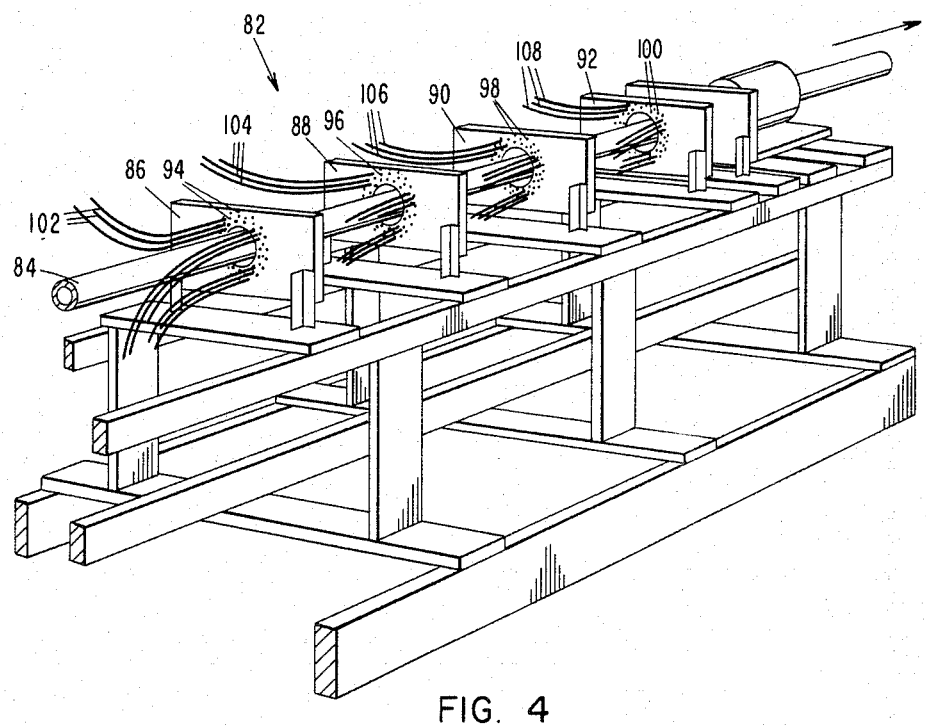
FIG. 4 schematically depicts in perspective an applicator for applying longitudinally disposed fibers to a process mandrel portion passing through the applicator downstream from the portion of FIG. 3.
Figure 4A:
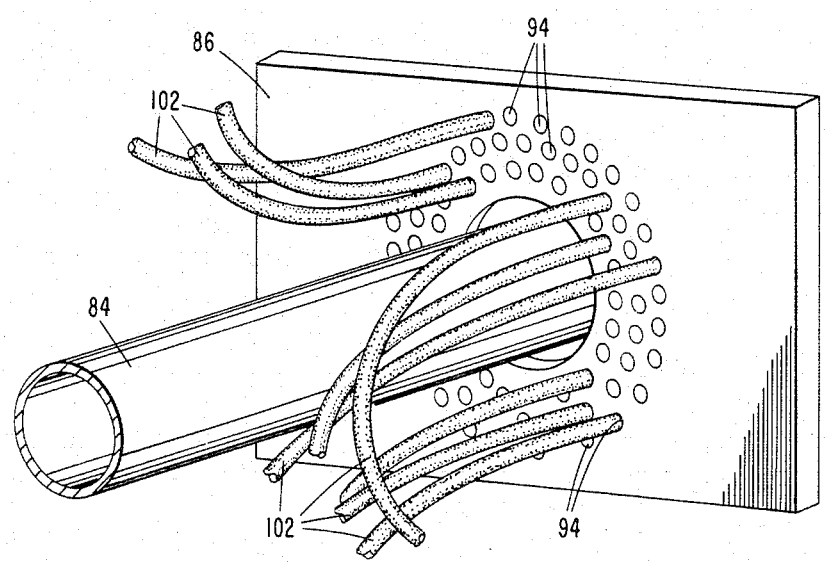
FIG. 4A is a detail of fiber application ring of an applicator in FIG. 4.

FIGS. 4 and 4A schematically illustrate longitudinal fiber applicator 82 which is depositing continuous filaments longitudinally (relative the center longitudinal axis of process mandrel portion 84) along the process mandrel. Spaced fiber disposition rings 86, 88, 90, 92 permit issuance of continuous fiber passing from remote spools or creels (not shown) through their respective offset holes 94, 96, 98 and 100. Holes 94, 96, 98 and 100 are respectively spaced about segmented mandrel portion 84 in these rings 86, 88, 90, 92. There are about 51 holes in each of the spaced disposition rings 86, 88, 90, 92. Each individual hole in holes 94, 96, 98 and 100 receives up to about 36,000 or more filaments. Conduits 102, 104, 106, 108 lead from the creels to respective holes 94, 96, 98 and 100 to maintain alignment of the roving or yarn passing to each of these holes. The roving or yarn issue from these holes to process mandrel portion 84 without any surrounding conduit.

In making the light truck composite tubes, there are four rings longitudinally spaced between about 12 and 18 inches from each other. These rings deposit continuous filaments at a zero degree angle relative to a line parallel to the central longitudinal axis of the process mandrel.

Figure 5:
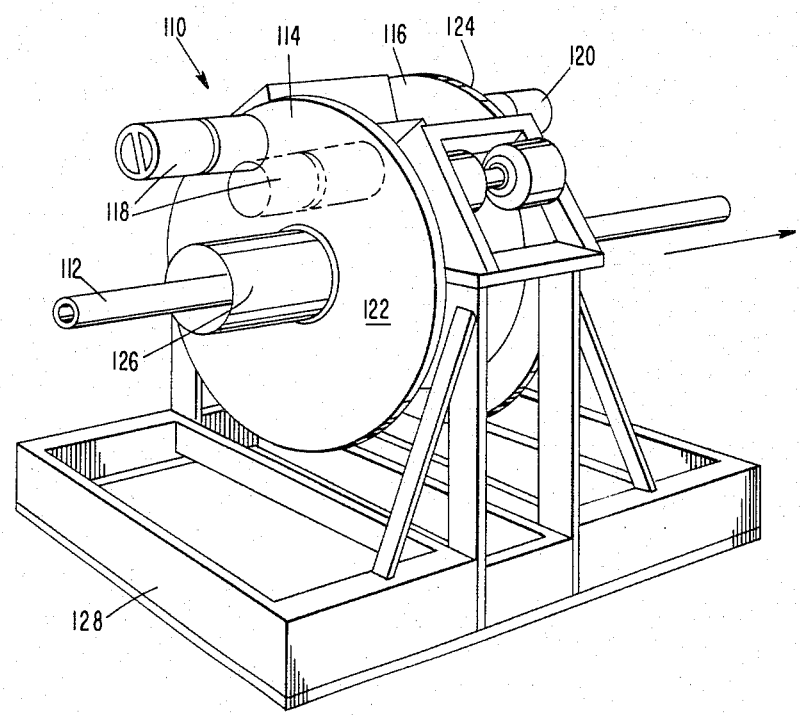
FIG. 5 schematically depicts in perspective an applicator for applying circumferentially disposed fibers to a process mandrel portion passing through the applicator downstream from the portion of FIG. 4 or FIG. 3.

FIG. 5 schematically illustrates device 110 that is depositing fiber circumferentially about process mandrel portion 112. Device 110 serves the function of providing hoop windings in the fabrication sequence of FIG. 1 and rotatably mounts to fixed mount 128.

Device 110 has wheels 114, 116 which rotate in tandem. Wheels 114, 116 carry spools 118, 120 about their respective outer face peripheries 122, 124. Continuous filament feeds from these spools to a rotating eyelet (not shown) between wheels 114, 116 for depositing the filaments onto mandrel portion 112.

The eyelet rotates about process mandrel portion 112 with wheels 114, 116 at a rate, relative axial translation of process mandrel portion 112, which permits a desired angle of fiber disposition.

Figure 6:
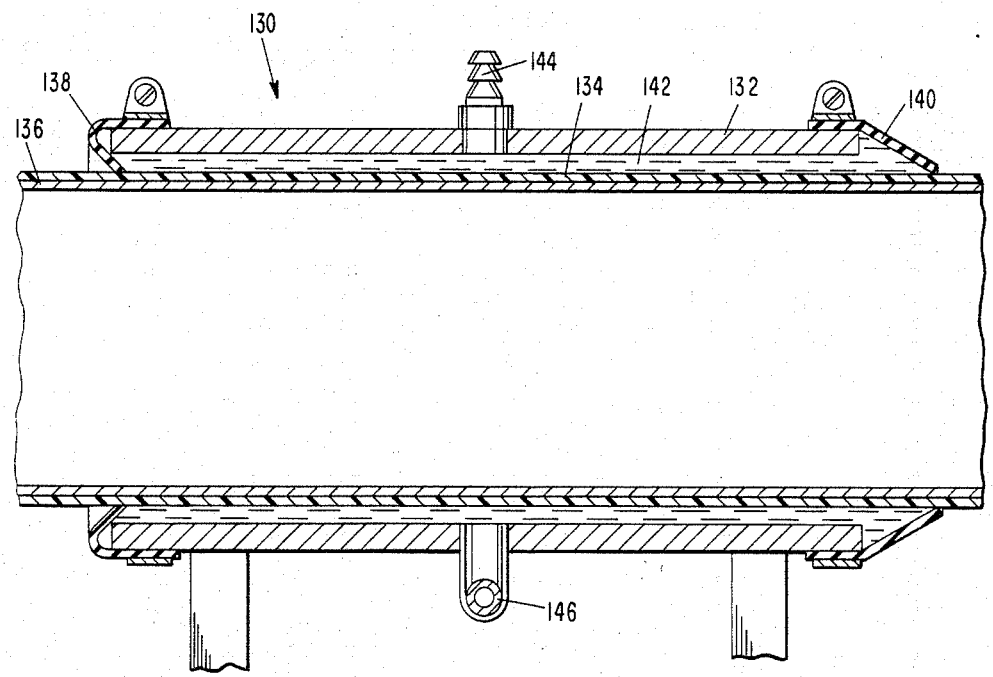
FIG. 6 schematically depicts a cross section of a resin applicator chamber for impregnating fiber carried by a process mandrel portion passing through the chamber downstream from the portion of FIG. 5.

FIG. 6 is a diagrammatic cross section of resin applicator device 130 which is serving to impregnate fiber as discussed in connection with the fabrication sequence of FIG. 1. Applicator device 130 comprises resin chamber 132. Fibrous tube 134 carried by process mandrel portion 136 passes through resin chamber 132 which is circumferentially sealed at its mandrel entry and exit orifices by rubber ring seals 138, 140, respectively.

Resin chamber 132 is filled continuously with resin 142 at inlet 144 with liquid resin at a pressure of between about 4 ft. and 8 ft. resin head. Outlet 146 can be used as overflow, if desired. The resin can be any hardenable liquid resin and preferably is vinyl ester thermosettable resin (e.g. Derakane, from Dow Chemical Co., Midland, Mich.) formulated with suitable peroxide catalyst and maintained at between about 60° and 90° F. in chamber 132. The use of vinyl ester resin with peroxide catalyst gives thermosettable resins with appropriate pot lives (e.g. between about 8 and 12 hours) for shift operations.

Figure 7:
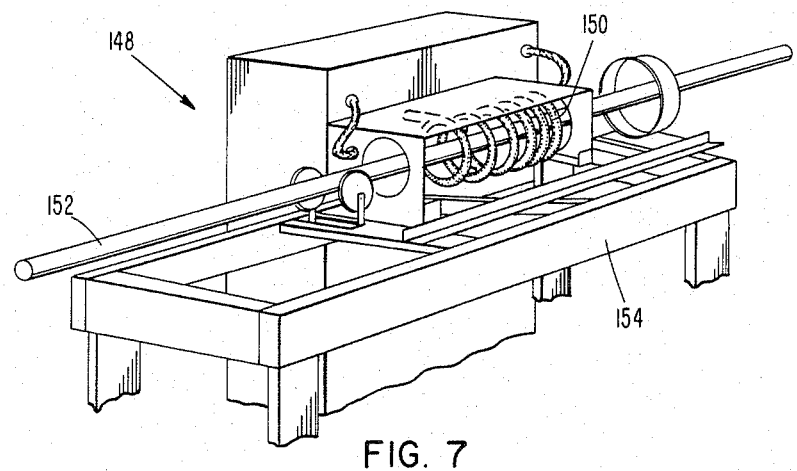
FIG. 7 schematically depicts in perspective a bank of induction coils used to cure a resin and fiber tube carried by a process mandrel portion passing through the coils downstream from the portion of FIG. 6.

FIG. 7 is a schematic illustration of induction heater device 148 which is serving the function of curing thermosettable resin as described in reference the tube fabrication sequence in FIG. 1. Curing device 148 is mounted on fixed mounts 154 and has a plurality of induction coils 150 spaced about resin and fiber covered process mandrel portion 152 passing therethrough. The heating by induction coils 150 is calibrated at various mandrel speeds to permit automatic operation of the tube fabrication.

Figure 8:
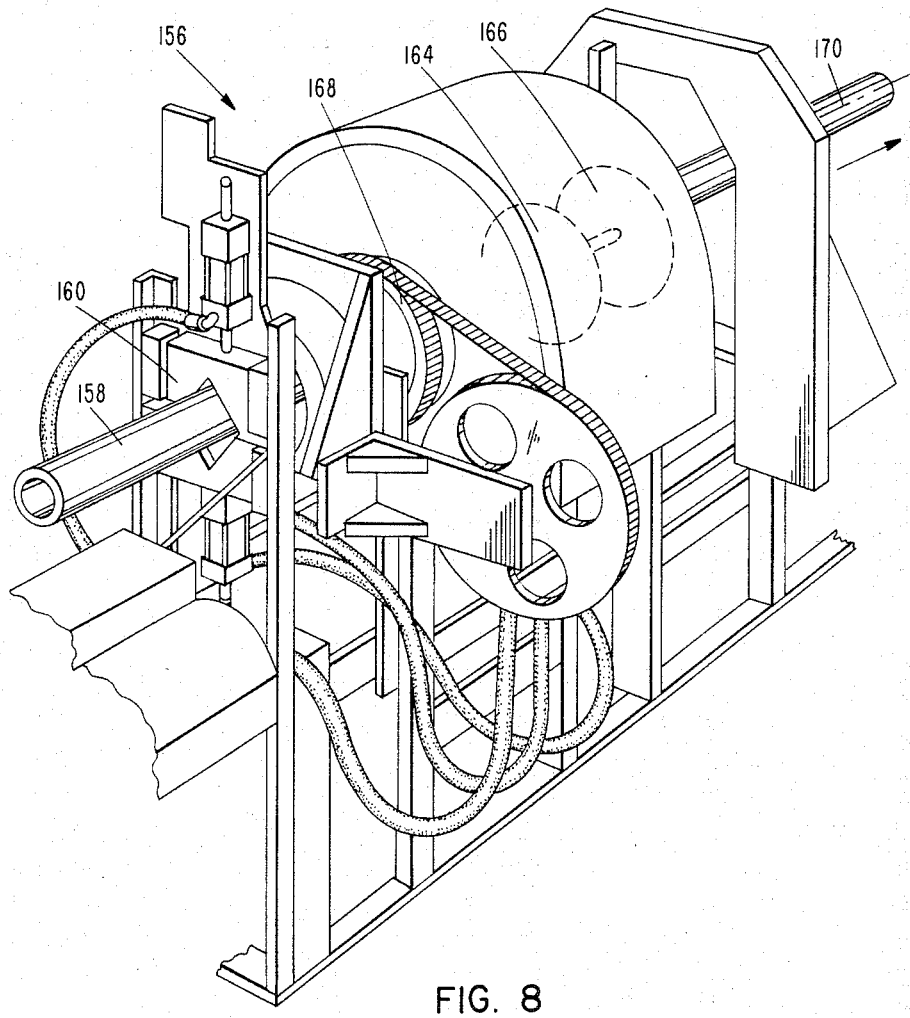
FIG. 8 schematically depicts in perspective a two blade rotating cutting wheel for cutting a moving tube of hardened resin and fiber produced in accordance with this invention and carried by a process mandrel portion downstream from the portion of FIG. 7.

FIG. 8 is a schematic illustration of tube cutting device 156 which is serving to sever hardened tube 158 adjacent the juncture between joined mandrel segments of the process mandrel as discussed in conjunction with the process steps in FIG. 1.

Cutting device 156 has rotating saw blades 164, 166 mounted to rotating disc 168. Rotating disc 168 rotates rotating saw blades 164, 166 about axis 170 while at the same time translating longitudinally along this axis 170 (in the direction shown) at the same rate as the joined mandrel segments. Saw blades 164, 166 rotate around their own axes and this axis 170 in severing a cylindrical section (e.g. tube 36, FIG. 2) from composite tube 158 on either side of the juncture between the adjacently joined mandrel segments. The plastic sleeve (see FIG. 2) underneath the composite tube 158 provides tolerance for the cutting of blades 164, 166.

Hydraulically activated clamp 160 grips composite tube 158 and prevents rotation thereof while translating with the moving process mandrel. Clamp 160 moves in tandem with blades 164, 166 along axis 170 while they cut tube 158 and then indexes with them back to the starting position.

Figure 9:
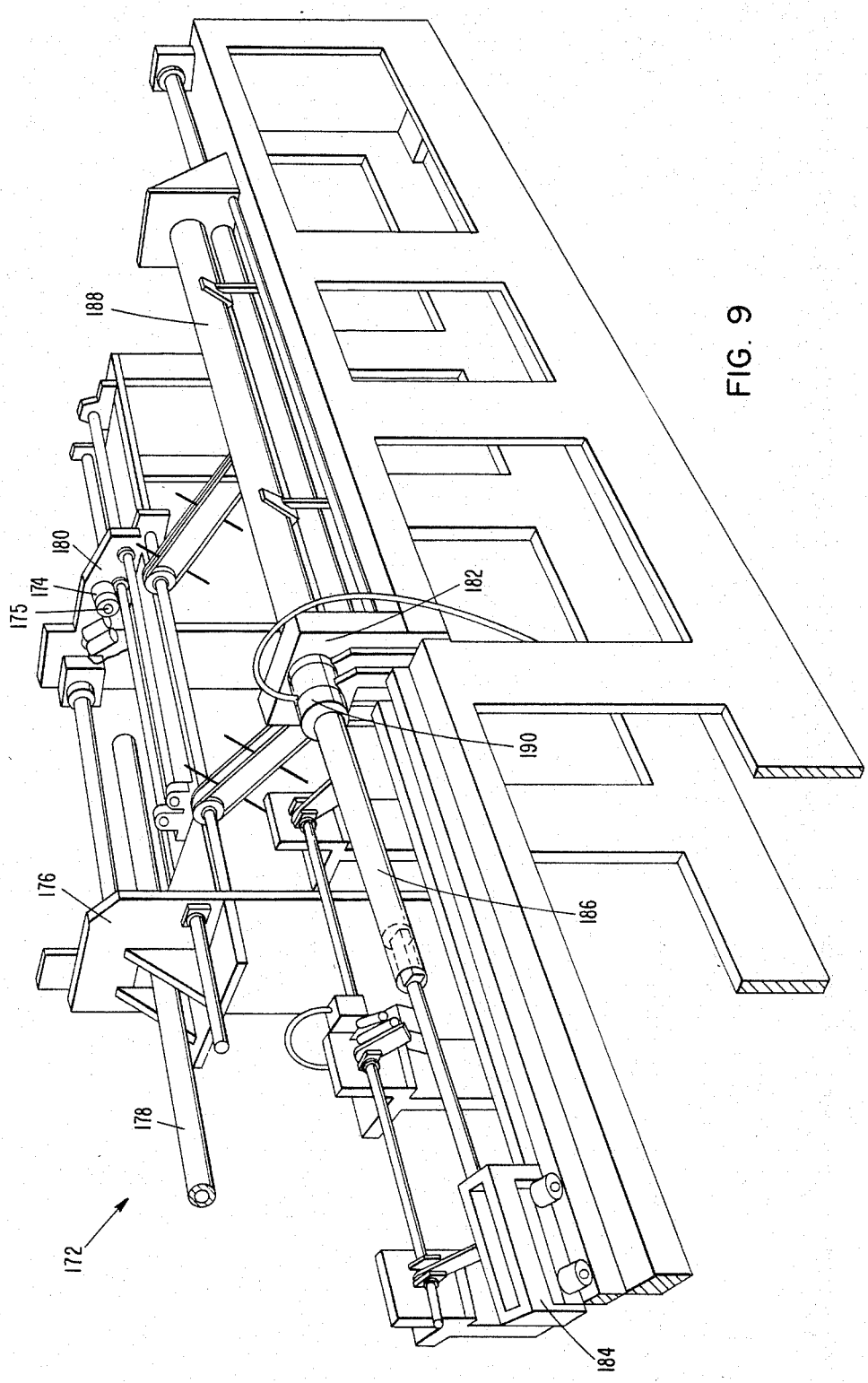
FIG. 9 schematically depicts in perspective an integrated device that disconnects mandrel segments and subsequently draws a composite tube from each of the disconnected mandrel segments. The mandrel segment being disconnected is downstream of the process mandrel portion of FIG. 8.

FIG. 9 illustrates mandrel release and extraction device 172 which has functions as discussed in connection with the fabrication sequence in FIG. 1.

In disconnecting mandrel segments hex wrench 174 receives a hex head portion of a forward mandrel segment, such as shown by socket end 25 of mandrel segment 10 in FIG. 2, in hex socket 175 and, for pulling the unthreaded mandrel segments apart, grasps around this hex head portion rearwardly such as in annular groove 31 of mandrel segment 10. Wrench 174 rotates while clamps in housing 176 prevent rotation of the adjacent upstream mandrel segment of process mandrel portion 178 by gripping an intermediate tube section such as section 36 in FIG. 2. Pistons carrying the hex wrench 174 within housing 180 translate axially in the direction process mandrel travel during engagement of hex wrench 174 with the end of the mandrel segment being disconnected. Also, the clamps are piston loaded in housing 176 so as to allow axial translation with the process mandrel portion 178 during this disconnecting. Hex wrench 174 and the clamps in housing 176 index after each disconnection operation to their starting positions.

Once rotating hex wrench 174 disconnects the terminal segment of the process mandrel, the disconnected segment is moved offline (mechanically, by pistons) to tube extraction die 182 having extractor 184. Extractor 184 pulls mandrel segment 186 out of tube 188. Disconnected mandel segments, when being drawn from composite tubes, are simultaneously drawn through mold release bath 190. The composite tube 188 once freed can then be sent to storage, or alternatively, sent to a riveting operation which rivets the metal sleeves to the composite tubular members thereby completing manufacture of the drive shaft member.

Figure 10:
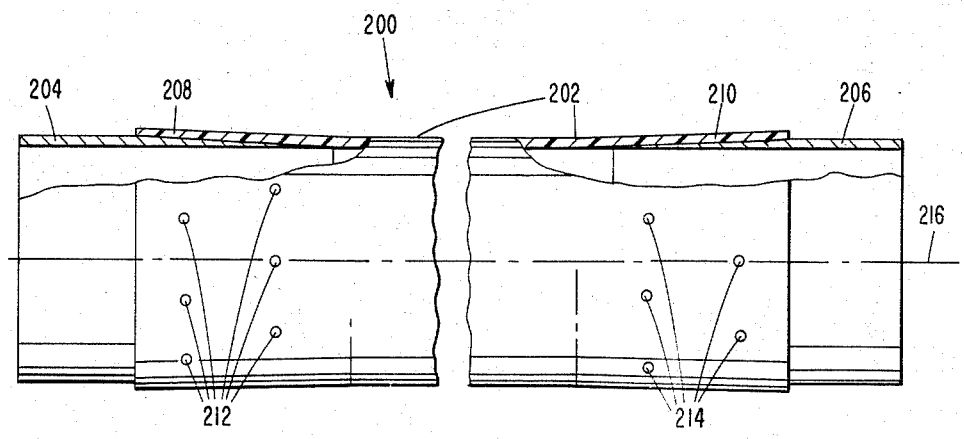
FIG. 10 is a view of a drive shaft member of this invention in elevation, including end fittings.

FIG. 10 depicts composite tube drive shaft member 200 which is for use in the drive train of a vehicle classified as a light truck. The drive shaft tube member 200 has been made using the techniques discussed in connection with the fabrication sequence of FIG. 1. Composite tube 202 carries hollow metal sleeves 204, 206 inside its flared ends 208, 210. Hollow metal sleeves 204, 206 are generally cylindrical in configuration; each of sleeves 204, 206, however, has a wall that thins toward the center of composite tube 202 with an inner diameter that is constant. Because of this thinning of the wall of the sleeves 204, 206, there is about a 1° taper to each sleeve. Rivets 212, 214 respectively pass through and around flared ends 208, 210 of composite tube 202 and through sleeves 204, 206 in fixing these sleeves 204, 206 in composite tube 202. Rivets 212, 214 are added after the tube fabrication sequence of FIG. 1 as a separate operation. Alternatively, sleeves such as sleeves 208, 210 can be adhesively bonded to a composite tube such as tube 202 after fabrication thereof.

Rivets 212, 214 each are disposed circumferentially about composite tube 202 in a pair of circles. Each circle of rivets has seven rivets, making 28 rivets per drive shaft.

Figure 10A:
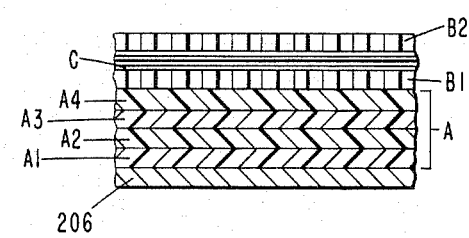
FIG. 10A is a diagramatic depiction of a wall portion of the composite of FIG. 10.

FIG. 10A diagramatically depicts a wall portion of tube member 200 of FIG. 10 that includes a portion of sleeve 206. The wall depicted in FIG. 10A typifies a wall of a composite tube that can be made in accordance with this invention; the filament in this wall is positioned for transmitting torque in the drive train of a motor vehicle that would be classified as a light truck.

The wall depicted in FIG. 10A has distinct, but integrated zones of continuous filament and resin. Zone A is composed of four subzones A1, A2, A3 and A4. Each of subzones A1, A2, A3 and A4 is a ply of E-glass filament in thermoset resin matrix. The angle at which the continuous glass filaments are disposed in these subzones is +45° or −45° (±30) relative to a line parallel to central longitudinal axis 216 of the composite tube 202 of FIG. 10. The filaments in zone A were deposited at stations B, D, F and H in the sequence of FIG. 1.

Zone B comprises subzones B1 and B2 spaced on either side of zone C in FIG. 10A. Each of subzones B1 and B2 has a ply of substantially circumferentially disposed continuous glass filaments. These filaments in zone B are E-glass and disposed desirably at an angle with an absolute value of between about 82° and 88°, normally between about 84° and 86°, relative to a line parallel to central longitudinal axis 216 of tube 202. The filaments in zone B were deposited at stations J and N in the sequence of FIG. 1.

Zone C of FIG. 10A comprises carbon or graphite fiber at an angle of zero degrees (±3°) relative to a line parallel to central longitudinal axis 216 of tube 202. These carbon or graphite fibers are 36,000 filament. The filaments in zone C were deposited at station L in the sequence of FIG. 1.

The filaments in composite tube 202 comprise between about 50% and 60% by volume of tube 202, the remainder being a crosslinked vinyl ester resin.

In an alternative embodiment, zone B has but a single ply of filament and this single ply is around the outside of zone C. In a variation of this embodiment, zone A has but a single layer of filament, i.e. zones A1 and A2. In still other applications of this invention, the filaments can be positioned during manufacture to suit requirements of such other applications.

What is claimed is:

1. A machine that manufactures composite tubes, said machine comprising:

an elongate segmented mandrel having plurality of threaded mandrel segments that endwise thread together in forming said segmented mandrel;

an axially reciprocating wrench for periodically engaging a next-in-line free mandrel segment, translating said free mandrel segment into engagement with a trailing segment of said segmented mandrel and rotating said fresh mandrel segment into threaded relation with said trailing mandrel segment;

an axially reciprocating grip jaw for gripping said segmented mandrel during threading of said fresh mandrel segment to said segmented mandrel;

a plurality of spaced filament applicators for depositing continuous filaments around said segmented mandrel as said segmented mandrel is drawn lengthwise past said filament applicators;

a plurality of resin applicators in alternating spaced relation with a portion of said filament applicators, said resin applicators for impregnating with resin those of said filaments previously applied around said segmented mandrel;

a resin hardening device downstream from said resin applicators, said hardening device for causing said resin to harden to provide a tubular composite around that portion of said segmented mandrel that has left said resin hardening device;

a puller for pulling on that portion of said tubular composite that has hardened sufficiently to accept gripping by said puller, said puller drawing said segmented mandrel past said filament and resin applicators and said hardening device;

an axially reciprocating saw for periodically severing said tubular composite adjacent junctures between adjacently joined segments of said segmented mandrel that are pushed to said reciprocating saw by said puller so as to provide composite tubes around respective mandrel segments passing said saw;

an axially reciprocating grip jaw for gripping said segmented mandrel about a next-in-line leading mandrel segment next behind a then leading mandrel segment while said then leading mandrel segment is unthreaded from said next-in-line leading mandrel segment;

an axially reciprocating wrench for periodically engaging said then leading mandrel segment, rotating said then leading mandrel segment out of threaded relation with said next-in-line leading mandrel segment and then axially translating said then leading mandrel segment in the direction that said segmented mandrel translates for disengaging said then leading mandrel segment from said segmented mandrel;

a transversely reciprocating pusher for periodically pushing a once leading but now disengaged mandrel segment carrying a composite tube off to the side of said segmented mandrel once said disengaged segment is released by said reciprocating wrench;

an extractor for extracting mandrel segments from said composite tubes.

2. A machine in accordance with claim 1, wherein said resin applicators comprise respective chambers through which said said segmented mandrel passes and is impregnated with resin.

3. A machine in accordance with claim 1, wherein said puller comprises a pair hand-over-hand clamps.

4. A machine in accordance with claim 1, wherein said resin hardening device comprises an induction heater.

5. A machine in accordance with claim 4, wherein said hardening device further comprises a radiant heater.

6. A machine in accordance with claim 1, wherein said filament applicators comprise wheels through which said segmented mandrel passes.

7. A machine in accordance with claim 6, wherein said filament applicators further comprise a plate through which said segmented mandrel passes centrally to receive filaments passing peripherially through said plate.

8. A machine in accordance with claim 7, wherein said filament applicators further comprise a wheel which spins around said segmented mandrel at a speed greater than said wheels through which said segmented mandrel passes.

9. A machine that manufactures composite tubes, said machine comprising;

a plurality of tubular mandrel segments forming an elongate segmented mandrel, said mandrel segments respectively comprising:
(i) a mandrel segment tube having a filament winding surface; and
(ii) a male threaded tube mounted within said segment tube at one end thereof, and a female threaded tube mounted within said mandrel segment tube at the other end thereof, said threaded tubes slidably engagable with, and threadable to, respective male and female threaded tubes of other of said mandrel segments;

an axially reciprocating wrench for periodically engaging a next-in-line fresh mandrel segment, sliding said fresh mandrel segment into internal engagement with a then trailing segment of said segmented mandrel, and rotating said fresh mandrel segment into threaded relation with said then trailing mandrel segment, such that the leading threaded tube of said fresh mandrel segment is slidably coupled with the trailing threaded tube of said then trailing mandrel segment, and then said threaded tubes are threaded together by rotation of said fresh mandrel segment relative said segmented mandrel, whereby said next-in-line fresh mandrel segment becomes said then trailing mandrel segment for connection with a new next-in-line fresh mandrel segment;

an axially reciprocating grip jaw for gripping said segmented mandrel around said trailing mandrel segment during addition of said fresh mandrel segment to said segmented mandrel;

a plurality of spaced filament applicators for continously depositing continuous filaments around said segmented mandrel as said segment mandrel is drawn lengthwise from said grip jaw and passed said filament applicators;

a plurality of resin applicators in alternating spaced relation with a portion of said filament applicators, said resin applicators impregnating with resin those of said filaments previously applied around said segmented mandrel;

a resin hardening device downstream from said filament and resin applicators, said hardening device for causing said resin to harden and continuously provide a tubular composite around that portion of said segmented mandrel that has left said resin hardening device;

a puller for pulling on that portion of said tubular composite that has hardened sufficiently to accept gripping by said puller, said puller drawing said segmented mandrel past said filament and resin applicators and said hardening device;

an axially reciprocating saw for periodically severing said tubular composite adjacent junctures between adjacently joined segments of said segmented mandrel that are pushed to said reciprocating saw by said puller so as to provide composite tubes around respective mandrel segments passing said saw;

an axially reciprocating grip jaw for gripping said segmented mandrel about a next-in-line leading mandrel segment trailing a then leading mandrel segment of said segmented mandrel while said then leading segment is unthreaded from said segmented mandrel;

an axially reciprocating wrench for periodically engaging said then leading mandrel segment of said segmented mandrel, rotating said then leading mandrel segment out of threaded relation with said next-in-line leading mandrel segment and then axially translating said then leading mandrel segment in the direction that said segmented mandrel is moving to disengage said leading mandrel segment and said next-in-line leading mandrel segment such that the trailing threaded tube of said then leading mandrel segment is unthreaded from the leading threaded tube of said next-in-line leading mandrel segment and said threaded tubes are slidably withdrawn from one another, whereby said next-in-line leading mandrel segment becomes a new leading mandrel segment;

a transversely reciprocating pusher for periodically pushing newly a disengaged mandrel segment carrying a composite tube off to the side of said segmented mandrel once said disengaged mandrel segment is released by said reciprocating wrench;

an extractor for extracting mandrel segments from said composite tubes.

10. A machine in accordance with claim 8, wherein said resin applicators comprise respective chambers through which said segmented mandrel passes and is impregnated with said resin.

11. A machine in accordance with claim 9, wherein said puller comprises a pair of hand-over-hand clamps.

12. A machine in accordance with claim 9, wherein said resin hardening device comprises an induction heater.

13. A machine in accordance with claim 12, wherein said hardening device further comprises a radiant heater.

14. A machine in accordance with claim 9, wherein said filament applicators comprise wheels through which said segmented mandrel passes.

15. A machine in accordance with claim 13, wherein said filament applicators further comprise a plate through which said segmented mandrel passes centrally to receive filaments passing peripherially through said plate.

16. A machine in accordance with claim 15, wherein said filament applicators still further comprise a wheel which spins around said segmented mandrel at a speed greater than said wheels through which said segmented mandrel passes.

* * * * *

UNITED STATES PATENT AND TRADEMARK OFFICE
CERTIFICATE OF CORRECTION

PATENT NO. : 4,528,060
DATED : July 9, 1985
INVENTOR(S) : Dee R. Gill & R. B. Marks It is certified that error appears in the above-identified patent and that said Letters Patent are hereby corrected as shown below:

Column 7, line 37;

"12" should read --10-- .

Column 9, line 66; after "176" should read

--release and then--.

Signed and Sealed this

Eighth Day of October 1985

[SEAL]

Attest:

Attesting Officer

DONALD J. QUIGG

Commissioner of Patents and Trademarks—Designate